United States Patent [19]

Halloran

[11] 4,365,849
[45] Dec. 28, 1982

[54] HYDRODYNAMIC SHAFT BEARING WITH CONCENTRIC OUTER HYDROSTATIC SQUEEZE FILM BEARING

[75] Inventor: John D. Halloran, East Amherst, N.Y.

[73] Assignee: Joy Manufacturing Company, Pittsburgh, Pa.

[21] Appl. No.: 235,372

[22] Filed: Feb. 19, 1981

[51] Int. Cl.³ .......................... F16C 7/04; F16C 35/00
[52] U.S. Cl. .......................................... 308/9; 308/71; 308/122
[58] Field of Search ...................... 308/9, 5 R, 71, 78, 308/121, 36.3, 122, DIG. 4

[56] References Cited

U.S. PATENT DOCUMENTS

| | | | |
|---|---|---|---|
| 2,660,484 | 11/1953 | Gerard et al. | 308/122 |
| 2,660,485 | 11/1953 | Gerard | 308/9 |
| 2,663,977 | 12/1953 | Gerard et al. | 308/9 X |
| 2,690,936 | 10/1954 | Cameron | 308/122 |
| 2,921,533 | 1/1960 | Williams | 103/111 |
| 3,121,596 | 2/1964 | Price | 308/71 |
| 3,365,958 | 1/1968 | Bard et al. | 308/9 X |
| 3,456,992 | 7/1969 | Kulina | 308/9 |
| 3,471,205 | 10/1969 | Farron et al. | 308/9 |
| 3,510,175 | 5/1970 | Dee | 308/9 |
| 3,510,176 | 5/1970 | Dee | 308/9 |
| 3,589,782 | 6/1971 | LeBreton | 308/122 |
| 3,647,272 | 3/1972 | Dee | 308/9 |
| 3,685,874 | 8/1972 | Gerard | 308/9 |
| 3,726,573 | 4/1973 | Unno | 308/9 |
| 3,746,328 | 7/1973 | Martt | 308/9 X |
| 3,814,554 | 6/1974 | Jansson et al. | 308/9 X |
| 3,863,996 | 2/1975 | Raimondi | 308/122 |
| 3,899,222 | 8/1975 | Mendelevsky et al. | 308/5 R |
| 3,929,394 | 12/1975 | Hackett et al. | 308/121 |
| 3,934,947 | 1/1976 | Walter et al. | 308/9 |
| 3,994,541 | 11/1976 | Geary et al. | 308/9 |
| 4,026,612 | 5/1977 | Goloff | 308/121 X |
| 4,090,743 | 5/1978 | Suzuki et al. | 308/9 |
| 4,097,094 | 6/1978 | Gardner | 308/9 |

FOREIGN PATENT DOCUMENTS 805824 12/1958 United Kingdom .................... 308/9

*Primary Examiner*—Robert S. Ward, Jr.
*Attorney, Agent, or Firm*—Raymond W. Augustin

[57] ABSTRACT

A bearing structure which incorporates the advantages of a hydrodynamic film and of a hydrostatic squeeze film. The structure uses an inner elongated cylindrical bearing member with a hydrodynamic bearing therein, and an outer bearing member axially encompasses the inner bearing member. Passageways and adjacent surface on such members establish fluid flow paths, hydrostatic pockets and squeeze film areas to support such inner bearing member.

9 Claims, 8 Drawing Figures

HYDRODYNAMIC SHAFT BEARING WITH CONCENTRIC OUTER HYDROSTATIC SQUEEZE FILM BEARING

BACKGROUND OF INVENTION

In the design of a bearing for supporting a rotating shaft a large number of variables must be considered, such as the axial and radial loads on the shaft, the range of speeds of operation of the shaft, temperature variations during operation and vibration of the shaft. There have been many bearing designs which have tried to satisfy some of the requirements imposed by these variables. But all such designs have had to compromise certain desirable performance to satisfy minimum criteria imposed by other of these variables. While such compromise designs provide satisfactory performance within a limited design range such compromise bearings are not satisfactory when the bearing must operate over a wide speed range carrying variable loads and being subjected to substantial vibrational forces. Such bearing environment is commonly encountered in centrifugal compressors, where the shaft for the high speed rotor is supported.

It is desirable in a rotor bearing system to broaden the independence of these numerous design variables and lessen the compromises that must invariably restrict satisfactory operation of the rotor bearing system.

Squeeze film damper bearings represent one approach to solving the problems of high speed shaft rotation, and vibration under varying bearing loads. Squeeze film bearing systems in use today are of two general types. The first type is a circumferential squeeze film clearance where load carrying capability is achieved by using a centering spring arrangement. Because of the tolerances involved, such a complex spring centered mechanism is costly and does not prove satisfactory. Such bearings are shown in U.S. Pat. Nos. 3,121,596 and 3,994,541 and 4,097,094. The second types of squeeze film dampener bearing does not use centering springs. This second type relies on cavitation within the squeeze film under conditions of vibration to achieve a load carrying capability. This load carrying capability is very difficult to control and occurs at the loss of a major portion of the squeeze film dampening due to the cavitation. Within both of these types of squeeze films dampener cavitation due to high vibratory acceleration rates will cause a major loss of dampening capability within the bearing structure. In U.S. Pat. No. 3,863,996 to Albert Raimondi an internal chamber is used to bleed lubricating fluid from a hydrodynamic layer which surrounds the rotating shaft. Such bleed lubrication is conducted through the interior of the bearing structure to each of a plurality of pockets disposed on the outer surface of an inner bearing. The pockets filled with pressurized lubricating fluid provides a damper layer of fluid between the bearing and the associated support structure. While such structure may dampen vibration from the shaft under some conditions, this apparatus makes such dampening dependent upon the pressure created by the rotating shaft within the hydrodynamic bearing. Obviously such design imposes considerable restraints on the construction of the bearing and the range of speed, load and vibrations which can effectively by a part of the system.

SUMMARY OF INVENTION

To overcome the problems in high speed bearing design and vibration dampening I provide for two bearings within a single structure. The inner bearing is a hydrodynamic bearing which can be designed in terms of optimizing the rotational support of the entire bearing system. The effective stiffness of the inner bearing should be considerably greater than that of the outer hydrostatic squeeze film so to force vibratory motion into the squeeze film where the major portion of effective system dampening can be obtained. The inner bearing design should tend to minimize negative crosscoupling effects so as to make the squeeze film dampening more dominant in the system. Using this invention it is no longer necessary to design the hydrodynamic bearing to a fine tune between the contradictory aims of minimizing effective stiffness while maximizing effective dampening. In fact the inner bearing may be quite conservatively designed in terms of unit loads and peak operating pressures.

The outer bearing is a structure for nonrotatably supporting the inner bearing. The outer bearing uses a plurality of hydrostatic pockets adjacent to lands. Flow of oil is established from a hydrostatic pocket and between the lands such that a thin squeeze film is formed. This squeeze film provides the dampening to the bearing system and the centering of the inner bearing. Since this squeeze film portion of the total bearing design has no crosscoupling effects the designer is free to set a desired stiffness and desired dampening contribution independent of the hydrodynamic bearing by controlling the dimensional configurations of the hydrostatic squeeze film such as for example the diameter, the number of pockets, axial length of the pockets, axial land length, circumferential pocket length, restrictor orifice size, radial squeeze film clearance, lubrication fluid characteristics, lubrication supply pressure, and the spacing and positioning of the hydrostatic pockets. Since the squeeze film properties are hydrostatic, no hydrodynamic effects are present thereby allowing the total bearing system effective stiffness and dampening to remain at satisfactory levels over a wide range of machinery operation. The externally fed and controlled hydrostatic squeeze film bearing provides load carrying capabilities or stiffness not only by squeeze film configuration but also by the independently controlled lubricant supply pressure. The centering of the shaft is done without mechanical means such as springs. The squeeze film cavitation and its attendant loss of viscous dampening is eliminated simply by control of the lubricant supply pressure.

It is an object of this invention to provide a bearing system which is capable of operating over a wide range of speeds and load while effectively dampening vibration at high speed. It is a further object of this invention to provide a bearing system in which the design parameters of the vibration dampening can be controlled independent of the rotational bearing support parameters. It is the further object of this invention to provide a bearing system which is reliable and which provides support and centering of the embodiment is shown in the following drawings in which: range from zero to top speed.

BRIEF DESCRIPTION OF THE DRAWINGS

The invention will become more fully understood from referring to the detailed description and drawings of the presently preferred embodiment. The pre

DESCRIPTION OF PREFERRED EMBODIMENTS

Figure 1:
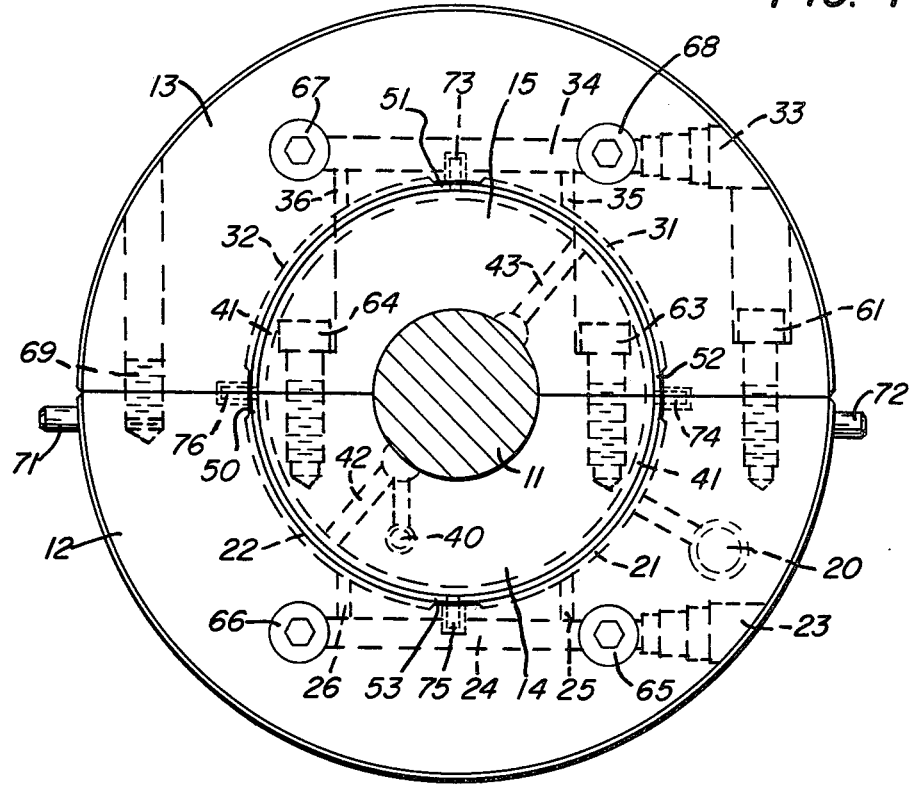
FIG. 1 is a side elevational view of the bearing structure with the shaft shown in cross section.

FIG. 1 shows a presently preferred embodiment of the invention having a 2-piece inner bearing composed of an upper half 14 and a lower half 15 supporting a rotating shaft 11. The inner bearing halves 15 and 14 are contained within an outer bearing having upper and lower halves 13 and 12 respectively. The inner bearing halves 14 and 15 rotatably support the shaft 11. The inner bearing upper and lower halves 14 and 15 are restrained from rotation by indexing studs or pins reference numerals 73, 74, 75 and 76 which engage respective receiving bores 77 in the outer bearing halves 12 and 13. Such engagement between the indexing studs 73, 74, 75, 76 and respective receiving bores is a loose fit so as to permit the inner bearing halves 14 and 15 to freely move within the bore formed by the outer bearing members, 13 and 12. While the embodiment in FIGS. 1-8 is shown with four indexing studs 73, 74, 75, 76 other presently preferred embodiments use only a single stud to index and restrain the inner bearing members from rotating relative to the outer bearing members. As can be seen in FIG. 1 the two inner bearing halves are joined to form one circumferential bearing by means of bolts 63 and 64. In like manner bolts 61 and 62 join the respective outer bearing halves 13 and 12 to form a single outer bearing. Additionally, the outer bearing has indexing pins 69 and 70 to assure proper alignment of the bearing halves during assembly. The outer bearing is retained in any standard bearing housing and pins 71 and 72 are used to index the assembly and resist the rotation of the outer bearing with respect to its mounting, not shown. While the embodiment in FIGS. 1-8 uses two pins, 71 and 72, it is to be understood that other presently preferred embodiments use a single pin or other means for indexing and preventing rotation of the outer bearing member relative to the mounting.

Figure 2:
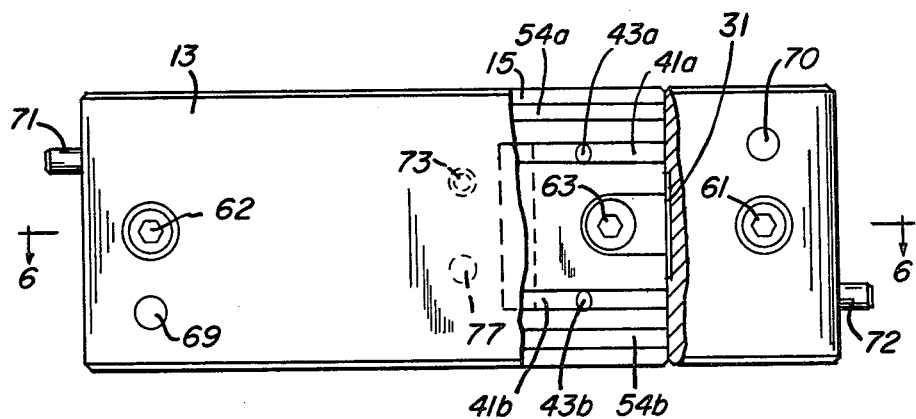
FIG. 2 is a top plane view of the structure of FIG. 1.
Figure 3:
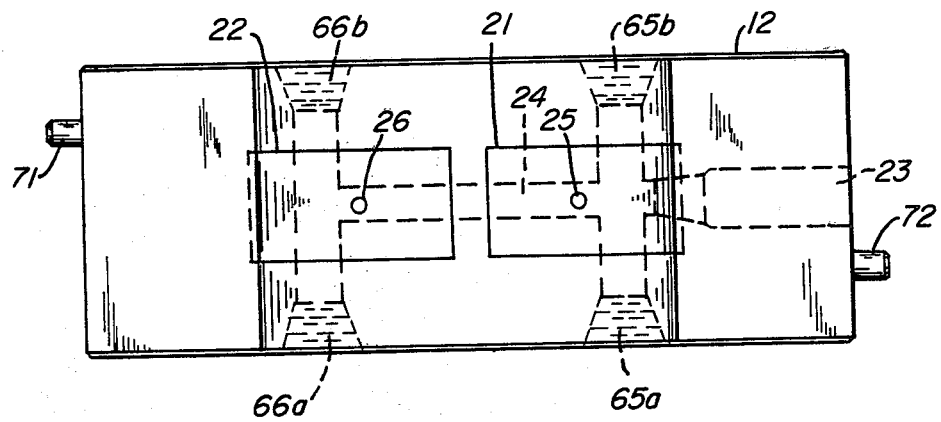
FIG. 3 is an elevational view of the lower bearing half of the outer bearing as shown in FIG. 1.

Pressurized lubricating fluid such as oil is fed to the bearing in two locations at fluid entrance fittings in the upper and lower halves 33 and 23 respectively. Fluid is fed from the entrance into bores 34 and 24 respectively in the upper and lower bearing halves. Threaded plugs 65, 66, 67 and 68 as shown in FIG. 1 and FIG. 3 contain the oil within bores 24 and 34. The lubricating fluid is fed from bores 24 and 34 through smaller diameter bores 25, 26 and 35, 36 respectively. Bores 25, 26, 35 and 36 act as restrictors in that they are of a small diameter or contain a small diameter orifice so as to restrict the flow of hydraulic fluid through the bores 24, 34 and into pockets 21, 22, 32, 31. Hydraulic fluid supplied to pockets 21, 22, 31 and 32 then establishes a hydrostatic squeeze film on the lands adjacent to such pockets and continues to flow across such lands to channels 41a and 41b which act as annular fluid collection channels in the inner bearing. As shown in FIG. 2 channels 41a and b are spaced laterally from the pocket 31 and extends circumferentially around the inner bearing members 14 and 15. Lubricating fluid collected in channels 41a and 41b are then delivered to the shaft to form a hydrodynamic bearing by means of bores 42 and 43. As can be seen in FIG. 2 each channel 41a and 41b have respective bores 43a and 43b for delivering the lubricating fluid to the hydrodynamic bearing established on the inner circumferential surface of the inner bearing members 14 and 15. The lower half of the inner bearing 14 also has respective channels 41a and 41b with respective bores 42a and 42b for supplying the hydrodynamic bearing surrounding the shaft 11.

Provision for sensing the lubricating fluid pressure in the pocket 21 of the hydrostatic squeeze film bearing is shown at reference 20 where a bore connects with pocket 21 to a threaded fitting which provides means for connecting to a pressure sensor, gauge, or other means for measuring the pressure in the hydrostatic bearing. Because the pressure in the hydrostatic pocket is important to the proper dampening of vibration additional provision, reference numeral 40, is shown which provides for pressure sensing means similar to that at reference numeral 20. The pressure sensing at 40 indicates the lubricating fluid pressure downstream from the hydrostatic pocket and generally adjacent the hydrodynamic bearing formed between the shaft 11 and inner bearing members 14 and 15.

The lubricating fluid supplied to the entrances 23 and 33 comes from an independent source of pressurized hydraulic fluid such for example as an electrically operated hydraulic pump, accumulator, or other hydraulic source. Such source supplies lubricating fluid independent of the rotation of the shaft 11. The pressurized lubricating fluid arrives at entrances 23 and 33 at a substantially constant pressure over the full speed and load range of shaft 11. The embodiment in FIGS. 1-8 lubricating fluid entering 23 and 33, but is is to be understood that in other presently preferred embodiments oil may be fed to bores 24 and 34 through piping connected to the threaded bores receiving plugs 65, 66, 67 and 68. Such an axial oil feed may be preferred especially on split design bearings where the upper and lower halves are separately supplied, such as for example feeding oil into the bores corresponding to plugs 67 and 66.

Referring to FIG. 2 shows the upper half of the outer bearing 13 which is clamped to the lower bearing half 12 by means of bolts 61 and 62. Shown in partial section is the outer surface of the inner bearing 15, one of the hyrostatic pockets 31 is seen in partial section. As can be seen adjacent the pocket 31 are collection channels 41a and 41b, each having respective bores 43a and 43b which feed inwardly shall be referenced to the central axis of the shaft which generally corresponds to the axis of rotation of the shaft. In referring to FIG. 2 sealing rings 54a and 54b are axially outward of the circumferential annular fluid collection channels 41a and 41b.

Figure 4:
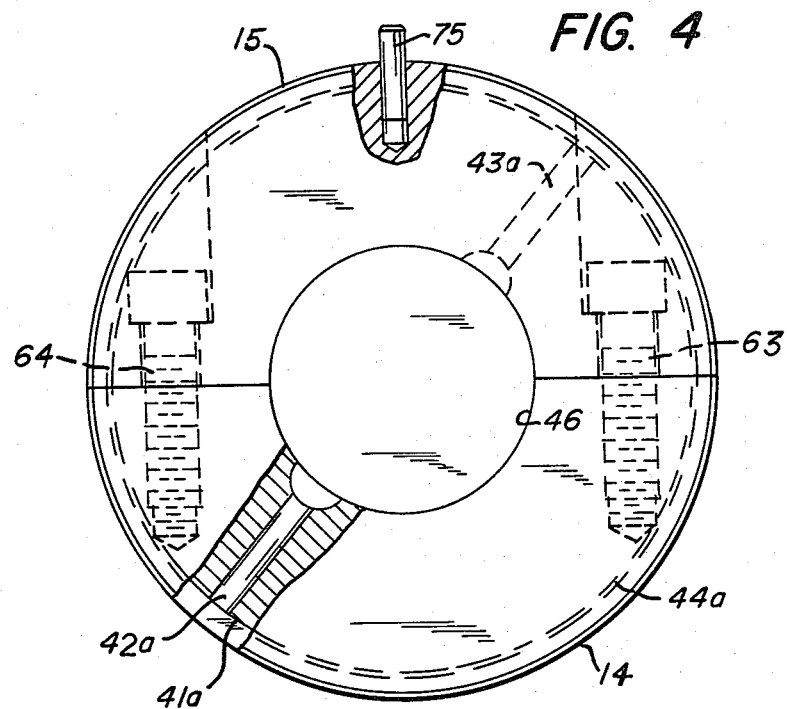
FIG. 4 is an elevational view in partial section of the 2-piece inner bearing of FIG. 1.

FIG. 4 shows the inner bearing halves 14 and 15 assembled to form the inner bearing member. As can be seen the inner circumferential surface 46 forms a journal type bearing. Other known types of hydrodynamic bearings can be fitted to surface 46. Oil or other lubricating fluid is supplied to that bearing by means of bores 43a and 42a. The oil supplied to the inner bearing has previously been collected in the annular fluid collection channels 41a and 41b after having passed through the hydrostatic squeeze film layer. Also shown in FIG. 4 is the annular sealing groove 44a in the outer surface of the inner bearing halves 14 and 15. The sealing grooves 44a and 44b are better shown in FIG. 5. Known sealing means such as resilient gasket material or O-rings may be used in sealing grooves 44a and 44b to effectively seal the annular cavity between the inner and outer bearing structures.

Figure 5:
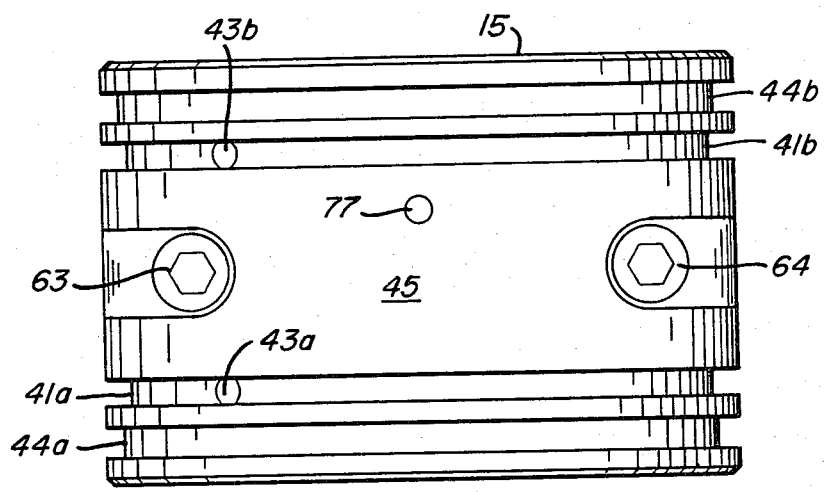
FIG. 5 is a top elevational view of the upper half of the inner bearing of FIG. 4.

Also shown in FIG. 5 are the annular fluid collection channels 41a and 41b. As can be seen collecting channels 41a and 41b are spaced from the outer circumferential surface 45 of the inner bearing member 15. The hydrostatic squeeze film is formed along the outer surface 45 of inner bearing members 14 and 15. The lubricating fluid collected in channels 41a and 41b is then delivered to the hydrodynamic bearing formed on inner surface 46 by means of collection bores 43a, 43b and 42a and 42b as is apparent from reference to FIGS. 4 and 5. The present preferred embodiment uses four such channels to provide lubricating fluid from the outer collection channels 41a and 41b to the hydrodynamic bearing established on surface 46.

Referring to FIG. 3 shows the lower half of the outer bearing 12. As can be seen there are two hydrostatic pockets 21 and 22. These pockets are fed a supply of lubricating fluid by means of bores 25 and 26 respectively which obtain fluid from the distribution channel 24. The opening of bores 25 and 26 into the pocket may be of any diameter consistent with the operating parameters of the hydrostatic bearing. The aperture size of the bores opening into the pockets 21, 22 and 31 and 32 may be orifices such as to act as restrictors. In other embodiments removable orifices may be used or other restrictive means.

Figure 8:
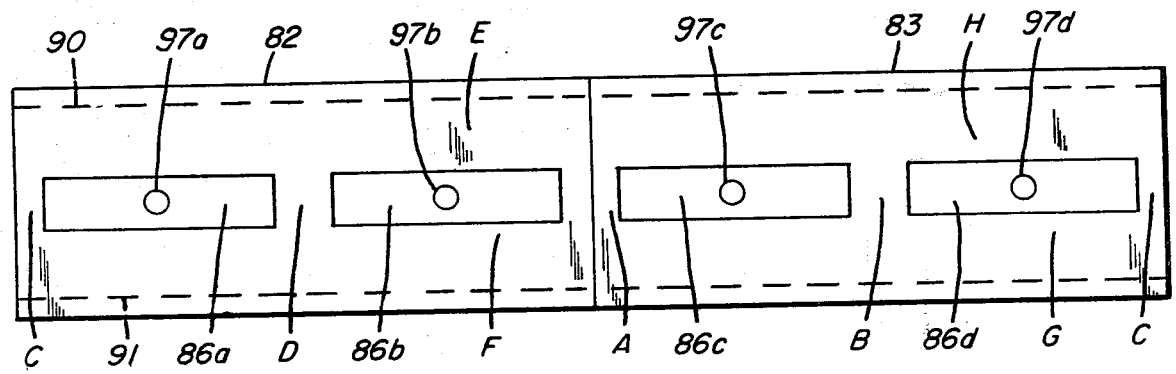
FIG. 8 is a elongated representation of the inner circumferential surface of the outer bearing member of the presently preferred embodiment.

Referring back to FIG. 1 as can be seen pockets 21, 22, 31 and 32 are spaced equally about the axis of the shaft and are separated by lands 50, 51, 52, 53, on the outer bearing halves 13 and 12. The annular cavity adjacent these lands 50, 51, 52, and 53 act as hydrostatic squeeze film areas. In operation of the bearing the hydrostatic bearing acts to center the inner bearing within the outer bearing and to dampen vibration transmitted from the shaft to the inner bearing. The radial spacing between the outer surface of the inner bearing and the lands 50, 51, 52, and 53 may be varied in designing the bearing such that the squeeze film adequately dampens and supports the shaft over its range of speed and load operation. In addition to the lands 50 through 57 a hydrostatic squeeze film is established in the annular space between the inner and outer bearings adjacent to the hydrostatic pockets 21, 22, 31 and 32. Some of these areas are shown in FIG. 8 at reference letters e, f, g and h.

Figure 6:
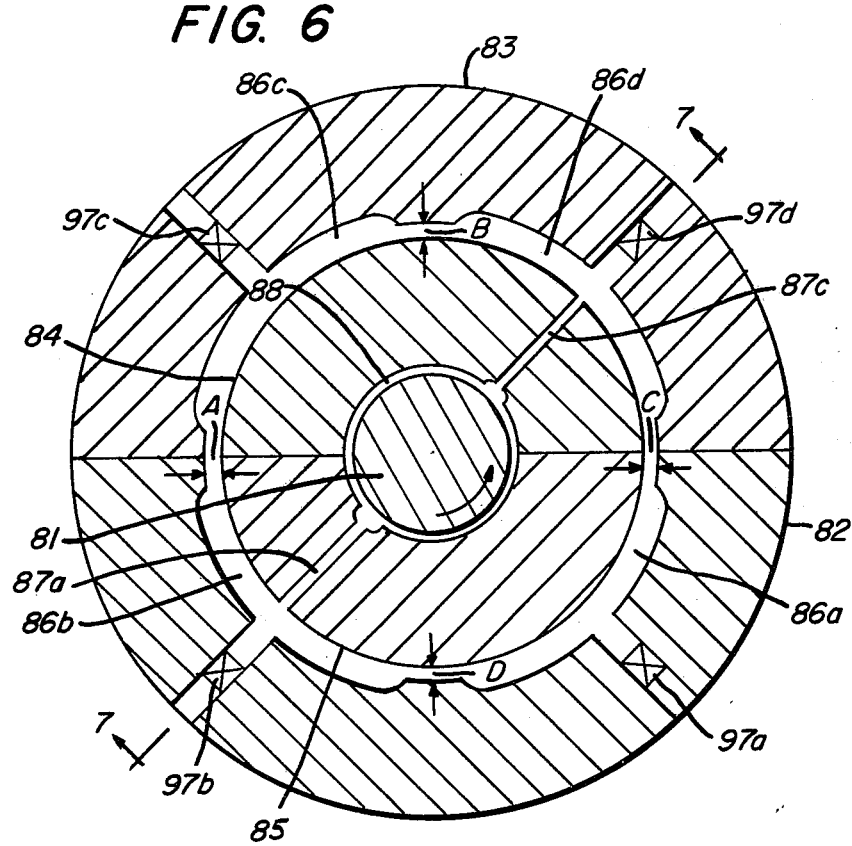
FIG. 6 is a diagrammatic representation of a cross section of the bearing assembly as would appear from a cross section of the presently preferred embodiment as shown in FIG. 2.

Referring to FIG. 6 shows a diagramatic representation of a presently preferred embodiment having an outer bearing composed of an upper half 83 and a lower half 82 and an inner bearing composed of an upper half 84 and a lower half 85. In the preferred embodiment depicted in FIG. 6 the lubricating fluid such as oil flows generally radially inward entering through the passageways having restrictors 97a, b, c and d. The hydraulic fluid then fills the pockets 86a, b, c and d adjacent such respective restrictors. The lubricating fluid is then free to surround the inner bearing halves 85 and 84 and form a thin squeeze film between adjacent surfaces of the outermost surface of the inner bearing members 84 and 85 and adjacent portions of the innermost surface of the outer bearing halves 83 and 82. As shown in FIG. 6 some of these adjacent surface areas are those areas separating the equally spaced pockets 86. The squeeze film established between the lands separating pockets and between the outer surface of the inner bearing are indicated in FIG. 6 at a, b, c and d. It is to be understood that other lands on the inner surface of the outer bearing members are also used as thin squeeze film bearing portions. For purposes of illustration FIG. 6 shows only areas a, b, c and d. Lubricating fluid from the hydrostatic bearing flows through bores 87a and 87c to provide lubricating fluid to an inner hydrodynamic bearing 88 which supports the rotating shaft 81.

In operation as the shaft 81 is caused to vibrate due to inbalance or dynamic loading conditions the inner hydrodynamic bearing 88 provides little dampening and acts as a stiff transmitter of such vibration forces to the inner bearing halves 84 and 85. During such vibration the inner bearing members 84 and 85 are caused to vibrate or move out of center with regard to the hydrostatic bearing which causes at least one of the spaces a, b, c or d to narrow. This narrowing of the squeeze film causes a resulting reduction in oil flow through the squeeze film area. This resulting restrictive flow creates a higher pressure within the adjacent pocket and within the squeeze film area. Such increase in pressure acts radially inward to forceably return the inner bearing halves and the shaft to the center position. As can be seen when an independent oil supply is used to provide pressure to the hydrostatic bearing such hydrostatic bearing can be designed to optimize vibration dampening without regard to the speed of rotation of the shaft. In addition to the squeeze films a, b, c and d as shown in FIG. 6 it is to be understood that other squeeze films axially adjacent to each of the pockets are used to provide dampening in the hydrostatic bearing.

Figure 7:
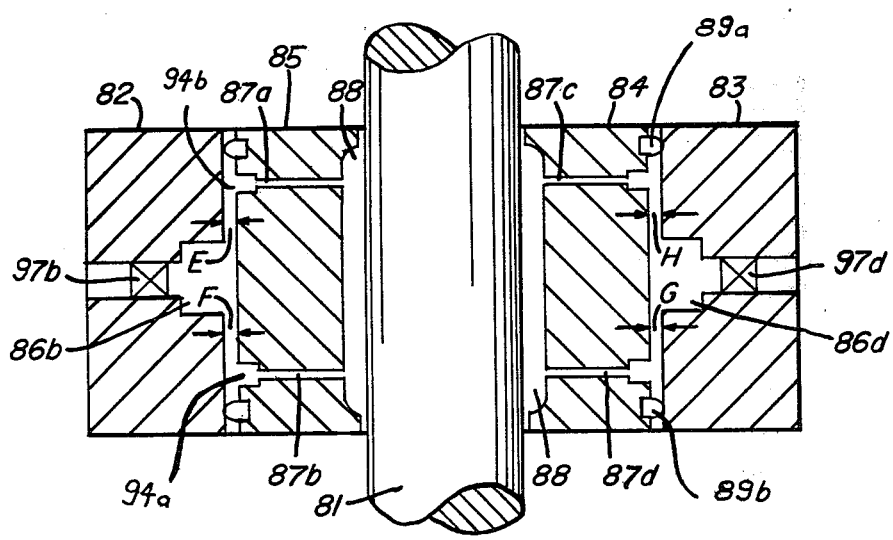
FIG. 7 is a diagramatic representation of a cross section of the bearing assembly taken across the section lines of FIG. 6.

Referring now to FIG. 7 there is shown a cross section of the bearing assembly of FIG. 6. Oil or other lubricating fluid enters the bearing and is directed radially inward through restrictors 97d and 97b into pockets 86b and d respectively. A thin hydrostatic squeeze film support of the inner bearing halves 84 and 85 is then established in areas between the inner surface of the outer bearing and the outer surface of the inner bearing such as for example areas e, f, g and h. These areas are lateral to the pockets 86b and d, and are in addition to the thin squeeze film areas a, b, c and d as shown in FIG. 6. The oil flowing through areas e, f, g and h is collected in the annular collection channels 94a and 94b. The hydrostatic bearing is sealed at either axial extent by resilient seals 89a and 89b. The oil continues to flow radially inward through the bores 87a, b, c and d to the inner dynamic bearing 88. The oil pressure supply to the hydrodynamic bearing 88 is sufficient to provide rotary bearing lubrication. As can be seen in FIG. 7 the oil flow through the bearing system composed of a hydrostatic and hydrodynamic bearing is generally radially inward, except for flow in the thin squeeze film layer itself. The oil flow in the thin squeeze film layer is generally axial with regard to the rotation of the shaft. As can be seen the spacing between the shaft 81 and the inner bearing member 85 is such that hydraulic fluid leaks from the axial ends of the hydrodynamic bearing 88. This leakage provides the outlet of the flow path for the hydraulic fluid from the bearing system. Other known forms to bleed fluid from the hydrodynamic bearing can be used so that a flow path is established through the squeeze film and so that the hydrodynamic bearing is adequately cooled.

FIG. 8 is a diagrammatic representation of the inner surface of the outer bearing halves 82 and 83 of FIG. 6 portrayed in linear fashion. The inner surface of the outer bearing halves contain four pockets 86a, b, c, and d. These pockets are arranged generally equiangular about the axis of the shaft and are of generally similar dimension. The result is that certain lands are created between adjacent pockets, such as that shown in a, b, c and d. These lands act as the outer surface of a thin hydrostatic squeeze film bearing. In addition, certain lands are also used as surface for the thin squeeze film bearing at positions e, f, g, and h, as indicated in FIG. 7. It is to be understood that the total surface area of the inner circumferential surface of the outer bearings 83 and 82 can be used as a squeeze film bearing surface. Such additional area would include that surface not comprising the pockets and between the lines 90 and 91. Such lines 90 and 91 represent the position at which either sealing means or collection of the oil by the annular channels 43 occurs in the hydrostatic bearing. From the present preferred embodiment shown in FIG. 8 it is apparent that a substantial thin film squeeze bearing is formed axially lateral of each pocket such as for example the surfaces e and f which are lateral with respect to pocket 86b.

The lubricating fluid or oil flow as occurs in the embodiment of FIG. 8 is for oil to enter pockets 86a, b, c and d through respective restrictors or orifices 97a, b, c and d. Upon filling each of the pockets 86a, b, c and d oil then is free to flow outward from each pocket into adjacent areas along the inner surface of the outer bearing members such as for example a through h to form a thin squeeze film layer between the outer cylindrical surface of the inner bearing members.

While the pockets 86a, b, c and d may be considered shallow as viewed from the geometry of the inner surfaces of the outer bearing; such pockets are termed deep pockets in that the depth of the pockets are many times greater than the thickness of the squeeze film established between the inner and outer bearing members.

As has previously been explained it is desirable to design the inner hydrodynamic bearing relatively stiff with regard to the outer hydrostatic bearing such that the vibration dampening can occur effectively in the hydrostatic squeeze film areas. Since the squeeze film portion of the bearing design has no crosscoupling effects to the hydrodynamic bearing the designer is free to set the desired stiffness and desired dampening contribution independently by controlling the dimensional configuration and pressures of the hydrostatic squeeze film. The presently preferred embodiments of the invention have been shown which when connected to an independent source of pressurized lubricating fluid form an effective bearing system which rotatably supports and dampens vibration over a wide range of speeds and load. While certain presently preferred embodiments of the invention have been shown and described it is to be distinctly understood that the invention is not limited thereto but may be otherwise variously embodied within the scope of the following claims.

I claim:
1. An inner elongated cylindrical bearing member having a central axially extending through bore therein for rotatably supporting a shaft in hydrodynamic relationship;
an outer elongated bearing member having a central axially extending through bore axially encompassing said inner bearing member with the inner surface of said outer bearing member being radially spaced from the outer surface of said inner bearing member to form a chamber therebetween;
said bores having generally coincident central axis;
sealing means cooperable with said bearing members in axially spaced relationship whereby said chamber is a closed volume chamber;
at least one of said members having at least three pockets therein in hydraulic communication with said chamber and extending radially with respect to said chamber and are equiangularly spaced with respect to said central axis;
said outer member having first passageway means therein to permit supplying of pressurized hydraulic fluid to said pocket and said chamber;
and second passageway means in said inner bearing member for placing said chamber in fluid communication with said bore of said inner bearing member establishing a hydraulic fluid flow path from such chamber to said bore in said inner bearing member whereby a path is formed for pressurized hydraulic fluid to enter said pockets through said first passageway and to flow through said chamber to form a hydrostatic bearing for supporting said inner member and to flow from said pockets to said second passageway and to flow through said second passageway to said bore of said inner bearing to form a hydrodynamic bearing for supporting such shaft.

2. The bearing assembly of claim 1 having four pockets formed in the surface of said bore in said outer member and radially spaced such that the four lands formed between such pockets are of substantially equal areas, and where such flow of lubricating fluid establishes a squeeze film bearing in said chamber in said open area adjacent said pockets and in said chamber axially between said pockets and said sealing means.

3. The bearing assembly of claim 1 wherein said second passageway means includes:
at least one annular channel extending around the outer cylindrical periphery of said inner bearing member and axially positioned between said sealing means and said pockets.

4. The bearing assembly of claim 1 wherein said hydrodynamic bearing in said inner bearing member is relatively stiff in supporting radial loads on such shaft relative to the support of radial loads by said hydrostatic bearing formed within the chamber between said inner and outer bearing members.

5. The bearing assembly of claim 1 further including means for connecting said first passageway to a source of supply of pressurized hydraulic fluid.

6. The bearing assembly of claim 1 further including a hydraulic pump means for supplying lubricating fluid to said first passageway in said outer bearing member, leading to said pockets; and said first passageway including restrictor means for restricting the flow in said first passageway.

7. The bearing assembly of claim 1 wherein said second passageway includes at least two radially extending channels on opposing axial sections of said inner member spaced from said pockets; and said chamber is partially bounded by the area between said pockets and said channels.

8. A bearing assembly for rotatably supporting a shaft comprising:

an inner bearing member for hydrodynamically rotatably supporting such shaft;

an outer bearing member for hydrostatically supporting said inner bearing member;

pump means for supplying a source of pressurized lubricating fluid to said bearing assembly;

said outer bearing member having a plurality of pockets disposed between bearing surfaces in said outer bearing member;

passageway means for supplying such pressurized lubricating fluid to said pockets;

said outer bearing member having lands adjacent said pockets such that lubricating fluid in such pockets is in fluid communication with said lands establishing a thin squeeze film between said outer bearing surfaces;

means for communicating the lubricating fluid flow through said thin squeeze film to said hydrodynamic inner bearing member.

9. The bearing assembly of claim 8 wherein said inner bearing member is relatively stiff in supporting radial loads on such shaft relative to the support of radial loads by said hydrodynamic outer bearing.

* * * * *

UNITED STATES PATENT AND TRADEMARK OFFICE
CERTIFICATE OF CORRECTION

PATENT NO. : 4,365,849
DATED : December 28, 1982
INVENTOR(S) : John D. Halloran

It is certified that error appears in the above-identified patent and that said Letters Patent are hereby corrected as shown below:

Column 2, lines 66 and 67 delete "embodiment is shown in the following drawings in which:" and insert --shaft and vibration dampening characteristics over the--

Column 3, line 5, delete "pre" and insert --present preferred embodiment is shown in the following drawings in which:--

Column 4, line 66, after "inwardly" insert --to the hydrodynamic bearing. As referred hereinafter axially--

Column 8, line 8 after "supporting" insert --such--

Signed and Sealed this

Twenty-second Day of March 1983

[SEAL]

Attest:

GERALD J. MOSSINGHOFF

Attesting Officer

Commissioner of Patents and Trademarks